(12) United States Patent
Lafreniere et al.

(10) Patent No.: US 11,645,942 B2
(45) Date of Patent: May 9, 2023

(54) CROSS-APPLICATION INTERFACE THAT FACILITATES SOFTWARE APPLICATION TRAINING

(71) Applicant: AUTODESK, INC., San Francisco, CA (US)

(72) Inventors: Benjamin Lafreniere, Toronto (CA); Tovi Grossman, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 1181 days.

(21) Appl. No.: 16/157,006

(22) Filed: Oct. 10, 2018

(65) Prior Publication Data

US 2019/0213911 A1    Jul. 11, 2019

Related U.S. Application Data

(60) Provisional application No. 62/614,320, filed on Jan. 5, 2018.

(51) Int. Cl.
| | |
|---|---|
| *G06F 3/048* | (2013.01) |
| *G09B 19/00* | (2006.01) |
| *G06F 3/0482* | (2013.01) |
| *G06F 3/04815* | (2022.01) |

(52) U.S. Cl.
CPC ....... *G09B 19/0053* (2013.01); *G06F 3/0482* (2013.01); *G06F 3/04815* (2013.01)

(58) Field of Classification Search
CPC .......... G06F 3/04815; G06F 3/0482; G09B 19/0053

USPC .................................. 715/705–715
See application file for complete search history.

(56) References Cited

U.S. PATENT DOCUMENTS

| 5,602,982 A * | 2/1997 | Judd ................. | G09B 19/0053 |
| | | | 706/927 |
| 2004/0041829 A1 * | 3/2004 | Moore .................. | G09B 7/04 |
| | | | 715/707 |

OTHER PUBLICATIONS

Ramesh, V., Hsu, C., Agrawala, M., Hartmann, B., "ShowMeHow: Translating User Interface Instructions Between Similar Applications", UIST'11, Oct. 16-19, 2011, Santa Barbara, CA, USA, pp. 127-134. (Year: 2011).*

(Continued)

*Primary Examiner* — Claudia Dragoescu
(74) *Attorney, Agent, or Firm* — Artegis Law Group, LLP

(57) ABSTRACT

One embodiment of the present invention sets forth a technique for facilitating the learning of a new software application. The technique includes causing a first user interface to be displayed on a display, wherein the first user interface is based on a user interface associated with a first software application; receiving a user input via the first user interface from a user; determining a first function associated with a second software application that should be provided to the user based on the user input; and causing the first user interface and a portion of a second user interface associated with the second application and incorporated into the first user interface to be displayed on the display, wherein the portion of the second user interface provides the first function to the user to enable the user to perform one or more subsequent operations relative to the first function.

20 Claims, 8 Drawing Sheets

(56) References Cited

OTHER PUBLICATIONS

Baecker, Ron, "Showing Instead of Telling", In Proceedings of the 20th Annual International Conference on Computer Documentation (SIGDOC 02), https://doi.org/10.1145/584955.584957, Oct. 20-23, 2002, pp. 10-16.

Bannert, M., "The effects of training wheels and self-learning materials in software training", Journal of Computer Assisted Learning, https://doi.org/10.1046/j.1365-2729.2000.00146.x, vol. 16, No. 4, 2000, pp. 336-346.

Bruckman, Amy, "Can Educational be Fun?", In Game Developers Conference, 1999, pp. 75-79.

Bruner, Jerome S., "The Act of Discovery", Harvard Educational Review, vol. 31, 1961, pp. 21-32.

Carroll et al., "Training Wheels in a User Interface", Communications of the ACM, vol. 27, No. 8, https://doi.org/http://doi.acm.org/10 1145/358198.358218, Aug. 1984, pp. 800-806.

Carroll et al., "Paradox of the active user", MIT Press, http://dl.acm.org/citation.cfm?id=28446.28451, 1987, pp. 80-111.

Catrambone et al., "Learning a Word Processing System with Training Wheels and Guided Exploration" In Proceedings of the SIGCHI/GI Conference on Human Factors in Computing Systems and Graphics Interface (CHI '87) https://doi.org/10.1145/29933.275625, 1987, pp. 169-174.

Deterding et al., "From Game Design Elements to Gamefulness: Defining "Gamification"", In Proceedings of the 15th International Academic MindTrek Conference: Envisioning Future Media Environments (MindTrek '11), https://doi.org/10.1145/2181037.2181040, Sep. 28-30, 2011, pp. 9-15.

Dong et al., "Discovery-based Games for Learning Software", In Proceedings of the SIGCHI Conference on Human Factors in Computing Systems (CHI '12), https://doi.org/10.1145/2207676.2208358, May 5-10, 2012, pp. 2083-2086.

Fernquist et al., "Sketch-Sketch Revolution: An Engaging Tutorial System for Guided Sketching and Application Learning", In Proceedings of the 24th annual ACM symposium on User interface software and technology (UIST '11), https://doi.org/10.1145/2047196.2047245, Oct. 16-19, 2011, pp. 373-382.

Fourney et al., "InterTwine: Creating Interapplication Information Scent to Support Coordinated Use of Software", In Proceedings of the 27th Annual ACM Symposium on User Interface Software and Technology (UIST '14), http://dx.doi.org/10.1145/2642918.2647420, Oct. 5-8, 2014, pp. 429-438.

Fu et al., "Resolving the paradox of the active user: stable suboptimal performance in interactive tasks", Cognitive Science, vol. 28, No. 6, https://doi.org/10.1016/j.cogsci.2004.03.005, Mar. 22, 2004, pp. 901-935.

Giannisakis et al., "IconHK: Using Toolbar Button Icons to Communicate Keyboard Shortcuts", In Proceedings of the SIGCHI Conference on Human Factors in Computing Systems, DOI: http://dx.doi.org/10.1145/3025453.3025595, May 6-11, 2017, 12 pages.

Grossman et al., "ToolClips: An Investigation of Contextual Video Assistance for Functionality Understanding", In Proceedings of the SIGCHI Conference on Human Factors in Computing Systems (CHI '10), https://doi.org/10.1145/1753326.1753552, Apr. 10-15, 2010, pp. 1515-1524.

Grossman et al., "A Survey of Software Learnability: Metrics, Methodologies and Guidelines", In Proceedings of the SIGCHI Conference on Human Factors in Computing Systems (CHI '09), https://doi.org/10.1145/1518701.1518803, Apr. 4-9, 2009, pp. 649-658.

Hart et al., "Development of NASA-TLX (Task Load Index): Results of Empirical and Theoretical Research", In Human Mental Workload, PA Hancock and N Meshkati (eds.). Elsevier, http://ntrs.nasa.gov/archive/nasa/casi.ntrs.nasa.gov/20000004342_1999205624.pdf, 1988, pp. 139-183.

Kelleher et al., "Stencils-Based Tutorials: Design and Evaluation", In Proceedings of the SIGCHI Conference on Human Factors in Computing Systems (CHI '05), https://doi.org/10.1145/1054972.1055047, Apr. 2-7, 2005, pp. 541-550.

Khan et al., "ViewCube: A 3D Orientation Indicator and Controller", In Proceedings of the 2008 Symposium on Interactive 3D Graphics and Games (I3D '08), https://doi.org/10.1145/1342250.1342253, Feb. 15-17, 2008, pp. 17-25.

Leung et al., "Multi-Layered Interfaces to Improve Older Adults' Initial Learnability of Mobile Applications", ACM Transactions on Accessible Computing, vol. 3, No. 1, Article 1, https://doi.org/10.1145/1838562.1838563, Sep. 2010, pp. 1:1-1:30.

Leutner, D., "Double-fading support—a training approach to complex software systems", Journal of Computer Assisted Learning, vol. 16, No. 4, https://doi.org/10.1046/j.1365-2729.2000.00147.x, 2000, pp. 347-357.

Li et al., "GamiCAD: A Gamified Tutorial System for First Time Autocad Users", In Proceedings of the 25th Annual ACM Symposium on User Interface Software and Technology (UIST '12), https://doi.org/10.1145/2380116.2380131, Oct. 7-10, 2012, pp. 103-112.

Mayer, Richard E., "Should There Be a Three-Strikes Rule Against Pure Discovery Learning?", The case for guided methods of instruction, The American Psychologist, vol. 59, No. 1, https://doi.org/10.1037/0003-066X.59.1.14, Jan. 2004, pp. 14-19.

Papert et al., "Situating Constructionism", In Constructionism, Ablex Publishing Coroporation, 1991, 17 pages.

Pongnumkul et al., "Pause-and-Play: Automatically Linking Screencast Video Tutorials with Applications", In Proceedings of the 24th annual ACM symposium on User interface software and technology (UIST '11), https://doi.org/1 0.1145/2047196.2047213, Oct. 16-19, 2011, pp. 135-144.

Ramesh et al., "ShowMeHow: Translating User Interface Instructions Between Similar Applications", In Proceedings of the 24th annual ACM symposium on User interface software and technology (UIST '11), https://doi.org/10.1145/2047196.2047212, Oct. 16-19, 2011, pp. 127-134.

Resnick, Lauren B., "Learning in school and out", Educational Researcher, vol. 16, No. 9, 150.216.68.200, Dec. 1987, pp. 13-20+54.

Rettig, Marc, "Nobody Reads Documentation", Communications of the ACM, vol. 34, No. 7, https://doi.org/10.1145/105783.105788, Jul. 1991, pp. 19-24.

Rieman, John, "A Field Study of Exploratory Learning Strategies", ACM Transactions on Computer-Human Interaction (TOCHI), vol. 3, No. 3, Sep. 1996, pp. 189-218.

Scarr et al., "Dips and Ceilings: Understanding and Supporting Transitions to Expertise in User Interfaces", In Proceedings of the SIGCHI Conference on Human Factors in Computing Systems (CHI '11), https://doi.org/10.1145/1978942.1979348, May 7-12, 2011, pp. 2741-2750.

Shneiderman, Ben, "Promoting Universal Usability with Multi-layer Interface Design", In Proceedings of the 2003 Conference on Universal Usability (CUU '03), https://doi.org/10.1145/957205.957206, Nov. 10-11, 2003, pp. 1-8.

Sweetser et al., "GameFlow: A Model for Evaluating Player Enjoyment in Games", https://doi.org/10.1145/1077246.1077253, ACM Computers in Entertainment, vol. 3, No. 3, Article 3A, Jul. 2005, pp. 1-24.

"https://en.wikipedia.org/wiki/Hausdorff_distance", retrieved Mar. 25, 2020, 4 pages.

Findlater et al., "Evaluating Reduced-functionality Interfaces According to Feature Findability and Awareness", In Proceedings of the 11th IFIP TC 13 International Conference on Human-computer Interaction (Interact'07), 2007, pp. 592-605.

\* cited by examiner

CROSS-APPLICATION INTERFACE THAT FACILITATES SOFTWARE APPLICATION TRAINING

CROSS-REFERENCE TO RELATED APPLICATIONS

This application claims priority benefit of the U.S. Provisional Patent Application titled, "CROSS-APPLICATION BRIDGES," filed on Jan. 5, 2018 and having Ser. No. 62/614,320. The subject matter of this related application is hereby incorporated herein by reference.

BACKGROUND OF THE INVENTION

Field of the Invention

The present invention relates generally to computer science and, more specifically, to a cross-application interface that facilitates software application training.

Description of the Related Art

Learning to use a new software application can be quite challenging, requiring a user to enter a new environment where existing knowledge of other software applications and related skills do not necessarily apply, or worse, can even work against the user. Common classes of problems that users face when learning to use a modern, feature-rich software application include understanding the sequences of operations to perform given tasks using the software application, awareness of all of different functionalities imparted by the software application, locating those functionalities within the software application, understanding how to use specific tools or functions unique to the software application, and transitioning to efficient behaviors when using and interacting with the software application. Taken together, these problems can make learning to use a new software application a difficult and daunting undertaking.

In addition, when faced with a new software application or application environment, users oftentimes experience certain psychological barriers, such as production bias and assimilation bias. Production bias is the learning theory concept where progress towards achieving a particular goal is paramount in the mind of a software application user. Due to production bias, a user generally may have little motivation to dedicate time to learning the different features of a new software application, even if such learning would save the user time and make the user more efficient in the long-run. Assimilation bias is the tendency of a user to solve a new problem with existing knowledge or techniques. Due to assimilation bias, a user may rely on familiar tools or functions of a new software application, instead of learning about the new tools or functions available in the new software application.

As the foregoing illustrates, what is needed in the art are more effective software application training techniques.

SUMMARY

One embodiment of the present invention sets forth a technique for facilitating the learning of a new software application. The technique includes causing a first user interface to be displayed on a display, wherein the first user interface is based on a user interface associated with a first software application; receiving a user input via the first user interface from a user; determining a first function associated with a second software application that should be provided to the user based on the user input; and causing the first user interface and a portion of a second user interface associated with the second application and incorporated into the first user interface to be displayed on the display, wherein the portion of the second user interface provides the first function to the user to enable the user to perform one or more subsequent operations relative to the first function.

At least one advantage of the disclosed techniques is that the user interface of a software application with which the user is already familiar can be used as a foundation for expanding the user's knowledge of a new and unfamiliar software application. Rather than working against the user's normal production and assimilation biases, operating in the familiar user interface enables the user to learn new functionalities of the software application while completing personally-relevant tasks. Thus, the user is not immersed in an unfamiliar computing environment that requires significant effort to accomplish simple tasks. As a result, the disclosed techniques improve the functioning or operation of a computing device. Specifically, the techniques described herein improve the efficiency of using a computing device by enabling the user to incrementally transition from a familiar user interface to the user interface of a different and/or more advanced software application. These advantages provide at least one technological improvement over prior art techniques, in which many advanced and powerful functions of a feature-rich software application are never learned by the user due to the steep learning curve associated with such software applications.

BRIEF DESCRIPTIONS OF THE DRAWINGS

Figure 4:
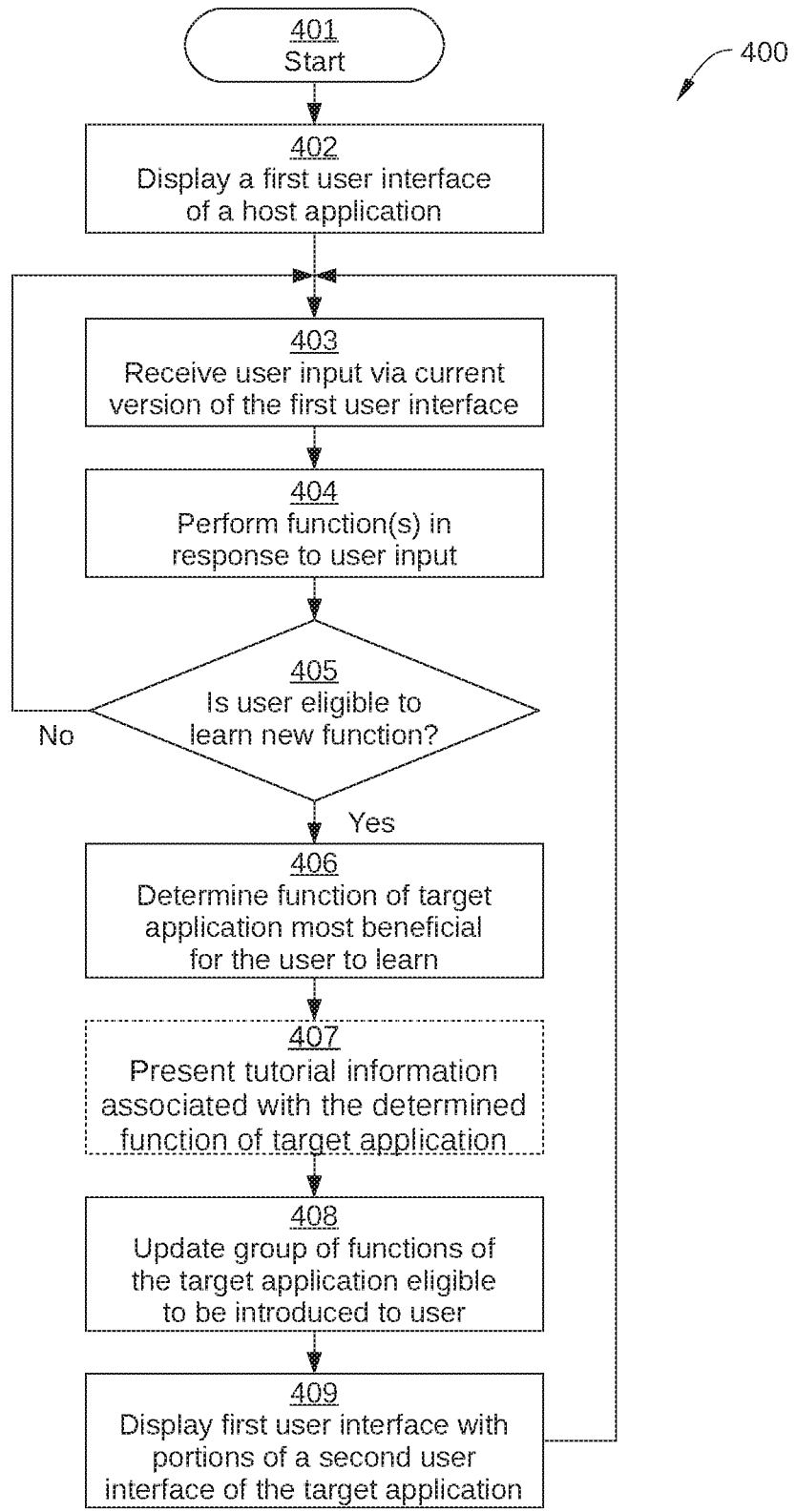

FIG. 4 sets forth a flowchart of method steps imparted via a graphical user interface for training a user to use a software application, according to various embodiments of the present invention.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
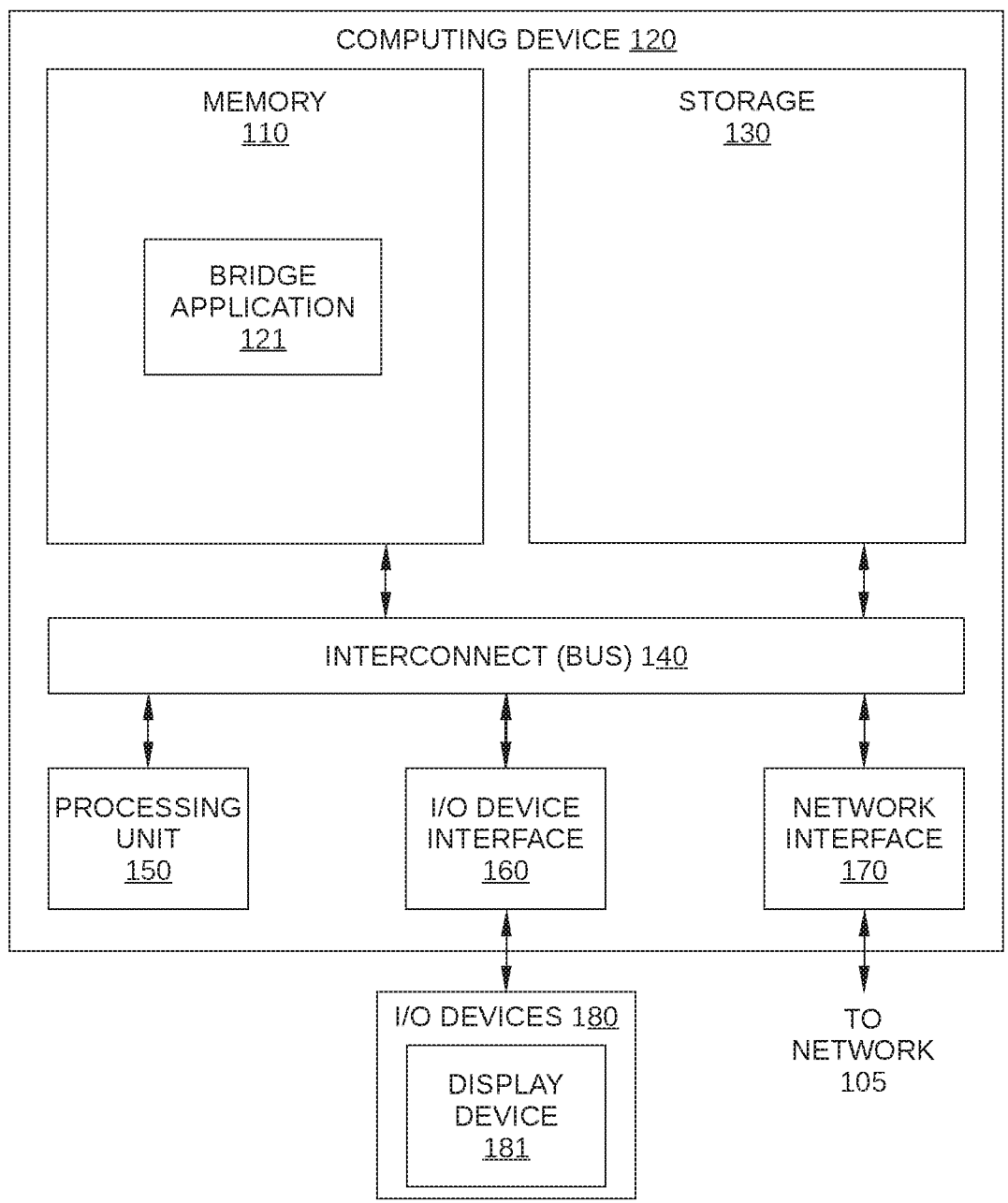
FIG. 1 is a block diagram of a computing device configured to implement one or more aspects of the present invention.

FIG. 1 is a block diagram of a computing device 100 configured to implement one or more aspects of the present invention. Computing device 100 may be a desktop computer, a laptop computer, a tablet computer, or any other type of computing device configured to receive input, process data, generate control signals, and display images. Computing device 100 is configured to run bridge application 121 and/or other suitable software applications, which reside in a memory 110. It is noted that the computing device described herein is illustrative and that any other technically feasible configurations fall within the scope of the present invention.

As shown, computing device 100 includes, without limitation, an interconnect (bus) 140 that connects a processing unit 150, an input/output (I/O) device interface 160 coupled to input/output (I/O) devices 180, memory 110, a storage 130, and a network interface 170. Processing unit 150 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 150 may be any technically feasible hardware unit capable of processing data and/or executing software applications, including bridge application 121. Further, in the context of this disclosure, the computing elements shown in computing device 100 may correspond to a physical computing system (e.g., a system in a data center) or may be a virtual computing instance executing within a computing cloud.

I/O devices 180 may include devices capable of providing input, such as a keyboard, a mouse, a touch-sensitive screen, and so forth, as well as devices capable of providing output, such as a display device 181. Additionally, I/O devices 180 may include devices capable of both receiving input and providing output, such as a touchscreen, a universal serial bus (USB) port, and so forth. I/O devices 180 may be configured to receive various types of input from an end-user of computing device 100, and to also provide various types of output to the end-user of computing device 100, such as one or more graphical user interfaces (GUI), displayed digital images, and/or digital videos. In some embodiments, one or more of I/O devices 180 are configured to couple computing device 100 to a network 105.

Network 105 may be any technically feasible type of communications network that allows data to be exchanged between computing device 100 and external entities or devices, such as a smart device, a wearable smart device, a web server, or another networked computing device (not shown). For example, network 105 may include a wide area network (WAN), a local area network (LAN), a wireless (WiFi) network, a Bluetooth network and/or the Internet, among others.

Memory 110 may include a random access memory (RAM) module, a flash memory unit, or any other type of memory unit or combination thereof. Processing unit 150, I/O device interface 160, and network interface 170 are configured to read data from and write data to memory 110. Memory 110 includes various software programs that can be executed by processor 150 and application data associated with said software programs, including bridge application 121.

Bridge Application Description

Figure 2:
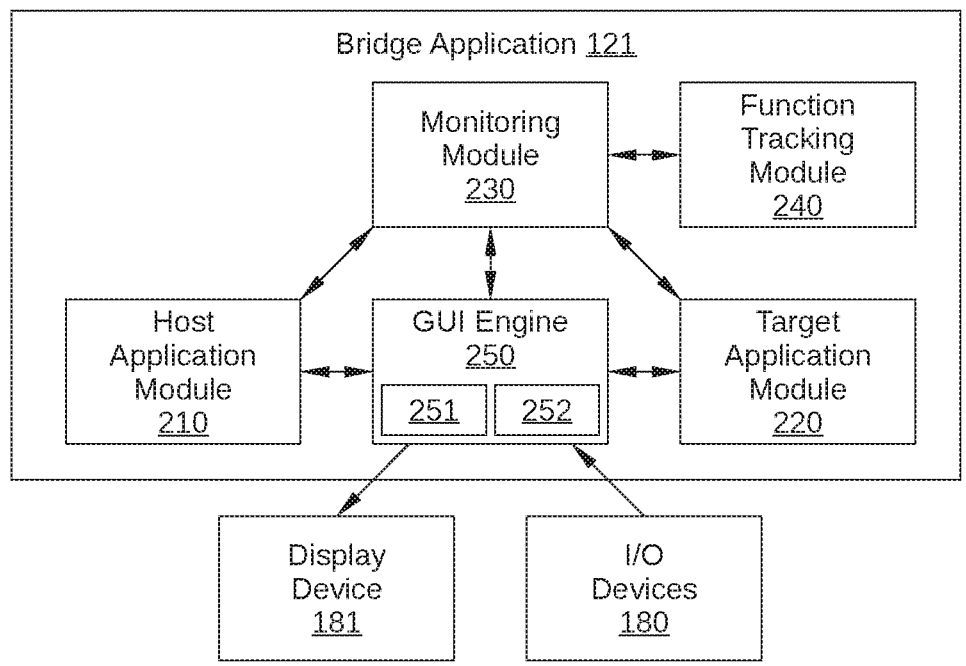
FIG. 2 is a more detailed illustration of the bridge application of FIG. 1, according to various embodiments of the present invention.

FIG. 2 is a more detailed block illustration of bridge application 121 of FIG. 1, according to various embodiments of the present invention. Bridge application 121 is a software application that is configured as a cross-application bridge that initially presents a user interface (such as a GUI) which is based on and appears similar to the user interface of a host software application familiar to the user. Gradually, the user interface presented by bridge application 121 changes the interaction model, tools, and conventions available to the user to resemble an interface of a target software application that is being learned by the user. Such changes are triggered by user behavior in the user interface, so that the new capabilities or functions of the target application presented to the user are presented in a motivated learning scenario. Thus, the new capabilities or functions being introduced are more likely to be understood and appreciated by the user. In this way, user motivation is facilitated by embracing the production and assimilation biases of the user. By contrast, conventional approaches to learning a new software application generally involve working against these biases. Specifically, the user is forced to enter a completely unfamiliar computing environment that can be based on data representations and/or interaction paradigms that are foreign to the user. Such situations can be highly demotivating for the user. As a result, users tend to avoid spending time on dedicated learning of specific features of a new software program unless forced to do so, even though such new features may be highly beneficial to the user over time.

As shown, bridge application 121 can include, without limitation, a host application module 210, a target application module 220, a monitoring module 230, a function tracking module 240, and a GUI engine 250. In addition, bridge application receives inputs from I/O devices 180 and sends outputs, such as a GUI (not shown) to display device 181.

According to various embodiments, the user interface provided to a user of bridge application 121 can be incrementally modified to include some or all features and functions, data representations, and interaction paradigms of a software application that a user intends to become proficient in, i.e., a so-called "target application." Such incremental modifications are implemented as the user becomes increasingly proficient with the target application. For example, the user interface that is based on the user interface of the host application can be incrementally modified to include the interaction paradigm of the target application (e.g., mouse functionality, drop-down menus, screen-edge menus, and the like). Similarly, the user interface that is based on the host application user interface can be incrementally modified to employ the data representation of the target application. For example, in the context of 3D building applications, a host application may represent the virtual workspace as a three-dimensional grid of voxels, while the target application represents the virtual workspace as a collection of solid shapes that can be placed in an location within a 3D space.

For a specific target application, bridge application 121 is configured based on a so-called "host application," which is a software application that is assumed to be familiar to a user. The host application for that specific target application is generally selected to have a substantially similar application domain as the target application. For example, in some embodiments, bridge application 121 can be configured to train a user in the use of a 3D solid modeling application, such as Tinkercad, with a host application that is directed to similar subject matter, such as a voxel-based 3D building game like Minecraft. Minecraft represents the world as a three-dimensional grid of voxels, and allows a user to engage in a simple form of 3D building in which the world is manipulated one block at a time. By contrast, Tinkercad represents a work area as a collection of solid shapes, and enables users to create, combine, scale, resize, and reposition various 3D primitive shapes. While Minecraft does not include more complex functions of Tinkercad or other 3D design software, Minecraft is directed to 3D building and navigation within a 3D virtual space. Thus, Minecraft can be a suitable host application for Tinkercad. Similarly, Tinkercad can be a suitable host application for more complex 3D or computer-aided design (CAD) programs.

Host application module 210 includes some or all of the code associated with the host application. According to various embodiments, a user interface that is provided to a user of bridge application 121, such as a GUI, is initially based on the user interface of the host application. Because the user of bridge application 121 is assumed to be familiar with the host application, the user begins use of bridge application 121 in an environment in which data representation and interaction paradigms are familiar, and can immediately begin performing tasks. Thus, host application module 210 enables the functionality of the host application and the generation of a user interface based on the user interface of the host application.

Generally, host application module 210 includes appropriate portions of the code of the host application so that the functionality, data representation, and interaction paradigm of the host application can be implemented when a user first begins using bridge application 121 to gain proficiency in the target application. For instance, in some embodiments, the host application may be interacted with by the user from a first-person perspective in which the user can navigate a 3D virtual workspace, and create or remove blocks up to a set distance in front of the user. In such embodiments, host application module 210 includes appropriate portions of the code of the host application to implement such an interaction paradigm.

Target application module 220 includes some or all of the code associated with the target application. Thus, target application module 220 enables the functionality of the target application and the generation of a user interface based on the user interface of the target application.

Function tracking module 240 tracks which functions and features of the target application have been introduced to a particular user. In some embodiments, the various user-selectable functions and features of the target application are introduced to a particular user sequentially. In such embodiments, the various user-selectable functions and features of the target application are introduced to each user in the same order. In other embodiments, the various user-selectable functions and features of the target application are introduced to a particular user based on one or more eligibility requirements. Various eligibility requirements or combinations of eligibility requirements may be employed by function tracking module 240 to determine what user-selectable functions and features of the target application are eligible to be introduced to a particular user.

In some embodiments, one such eligibility requirement is whether any precursor functions have been introduced to the user. That is, for a specific function included in the target application, if the one or more precursor functions for that specific function have not been introduced to the user, that specific function is not considered eligible for being introduced to the user. For example, in the context of 3D graphical design or computer-aided design, function tracking module 240 does not consider a "resize" function eligible for being introduced to the user until a "create a primitive" function has been demonstrated to the user in the course of using bridge application 121. This is because there is no need for using the resize function when no primitives exist that can be resized. Any other suitable eligibility requirement can also be employed by function tracking module 240 to determine whether a particular function or feature of the target application is eligible to be introduced to the user.

In some embodiments, another eligibility requirement is whether a specified number of user-selectable functions or features of the target application have been introduced to the current user of bridge application 121 within a certain time interval or within a certain number of tasks completed by the current user. Thus, if the current user of bridge application 121 has recently learned the specified number of functions or features, none of the functions or features of the target application are considered to be eligible. In such embodiments a user is not overwhelmed with a continuous stream of new functions to learn. In this way, retention of newly learned materials related to the target application is enhanced.

GUI engine 250 is configured to generate a user interface, such as a GUI, for a user that is interacting with bridge application 121. In many instances, portions of the user interface of the host application and the user interface of the target application are displayed to a user of bridge application 121. Consequently, for a virtual workspace for a particular user, GUI engine 250 may maintain a first data representation 251 for the host application and a second data representation 252 for the target application. For example, in the Minecraft/Tinkercad example, first data representation 251 may include data representing a 3D representation of the virtual workspace based on discrete blocks and block locations, while the second data representation 252 may include data representing a more continuous 3D space in which geometric primitives can be positioned at essentially any location in the 3D virtual workspace.

Monitoring module 230 tracks user activity while performing tasks in bridge application 121. For example, when a user repeatedly performs the same task, monitoring module 230 detects this behavior, and can select a function or feature to be introduced to the user that can achieve a similar result more efficiently. Typically, such functions or features are more advanced, and therefore are less likely to be known by the user. In an embodiment in which the host application is a 3D voxel- or block-based building game and the target application is a 3D building application that employs the placement and manipulation of "primitives" (geometric shapes), monitoring module 230 is configured to detect multiple uses of a user-selectable function of the host application, and determine equivalent function(s) in the target application that can be introduced to the user. One such embodiment is illustrated in FIGS. 3A-3D.

System Overview

Figure 3A:
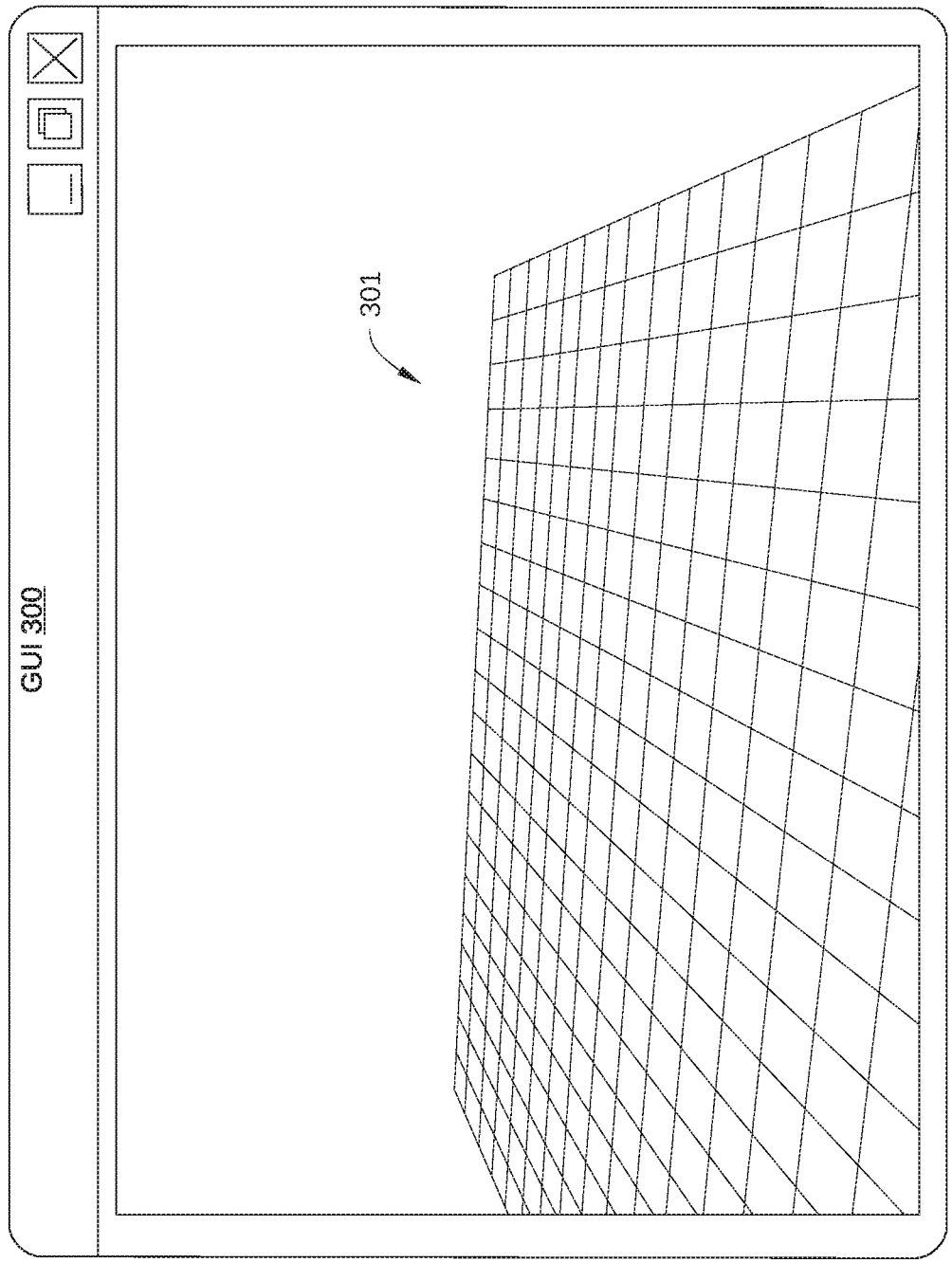
FIGS. 3A-3E are schematic illustrations of a graphical user interface (GUI) generated by the bridge application of FIG. 1, according to various embodiments of the invention.

FIG. 3A is a schematic illustration of a GUI 300 that displays a virtual space 301, according to various embodiments of the invention. Virtual space 301 is based on and generally resembles a user interface of a host application that is a 3D building game. Virtual space 301 provides a visual context for a space that a user or player can explore, interact with, and build structures in. In the embodiment illustrated in FIG. 3A, virtual space 301 is a voxel-based region in which a simple form of 3D building can be performed by creating, placing, and manipulating one block at a time. The host application is played from a first-person perspective, in which the user can navigate virtual space 301 and create or remove blocks up to a set distance in front of the current location of the user. As shown, when in host application mode, i.e., when the user interface presented to the user is very similar or identical to the user interface of the host application, GUI 300 includes no menus, panels, or buttons from the target application. In the embodiments illustrated in FIG. 3A, the user interface of the host application includes few or no menus or advanced functions.

Consequently, the host application can be performed with little preliminary or on-supplemental instruction.

Figure 3B:
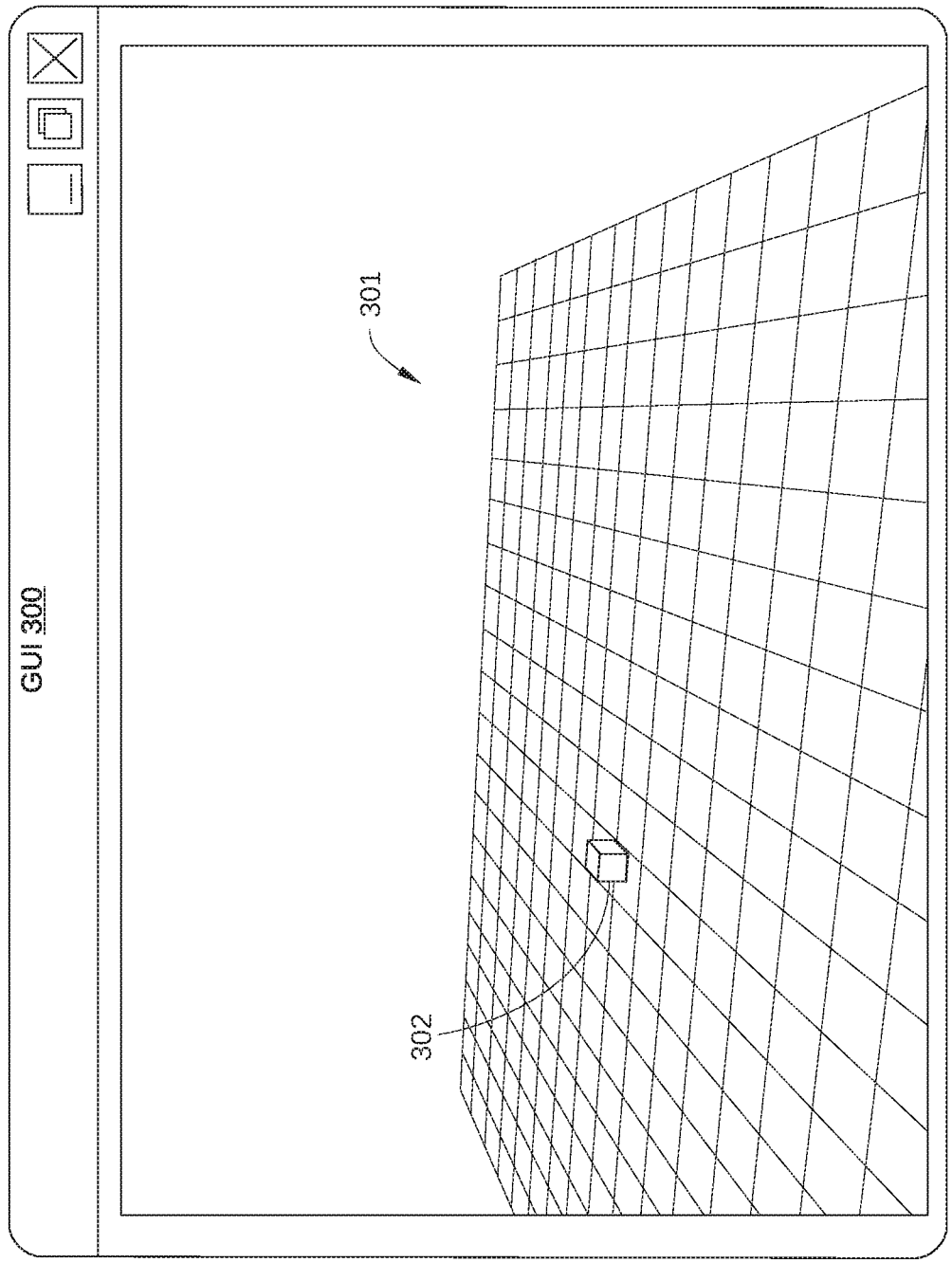

FIG. 3B is a schematic illustration of GUI 300 in which a user has placed a single block 302 in virtual space 301, according to various embodiments of the invention. As shown, block 302 has been placed in virtual space 301 by the user of bridge application 121, for example using one or more functions or features of the host application. As noted above, monitoring module 230 tracks user activity in virtual space 301 and, because no user-selectable function of the target application can complete the placement of block 302 in a more efficient way, no user-selectable function or feature of the target application is introduced to the user at this juncture.

Monitoring module 230 can include any suitable heuristic for determining that one or more eligible functions of the target application can be beneficial to the user at the present time. In some embodiments, monitoring module 230 makes such a determination based on an estimated time of completion of the task currently being performed by the user (e.g., creating an identical structure) with functions currently known by the user compared to completing the task with one or more eligible functions of the target application currently unknown by and unavailable to the user. In some embodiments, monitoring module 230 makes such a determination based one or more other factors, such as an estimated number of mouse clicks, a number of menus to be opened by the user, etc. when completing a task with functions currently known by the user compared to completing the task with one or more eligible function of the target application currently unknown by and unavailable to the user. Alternatively or additionally, in some embodiments, monitoring module 230 can include one or more machine learning algorithms to determine whether any eligible functions of the target application can complete the task currently being performed by the user, or can otherwise be beneficial to the user at the present time.

Alternatively or additionally, in some embodiments, such machine learning algorithms can be configured to determine whether an eligible function of the target application can be beneficial to the user in learning the target application. Thus, in contrast to the above-described embodiments, monitoring module 230 determines an eligible function to introduce to the user based on what portions of the target application the user has learned instead of on the current task being performed by the user. In such embodiments, monitoring module 230 can be configured to track or otherwise model a user's current knowledge of the target application, and to model or calculate the learning value of eligible functions of the target application.

Figure 3C:
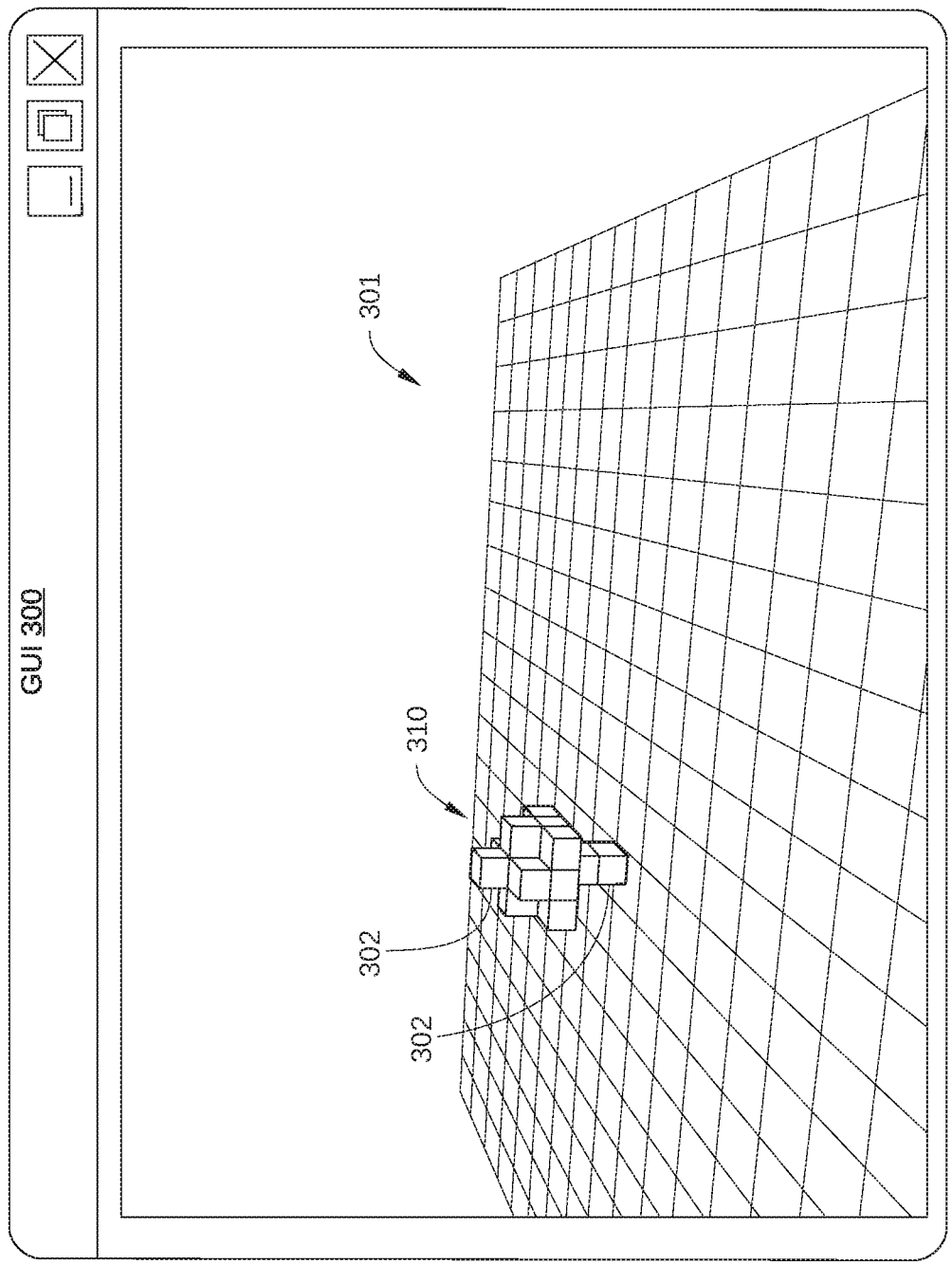

FIG. 3C is a schematic illustration of GUI 300 in which the user has placed a series of block 302 in virtual space 301 to form a structure 310, according to various embodiments of the invention. As shown, structure 310 (in this case, a block-based tree) is formed by the placement of a plurality of blocks 302 in appropriate locations within virtual space 301. Monitoring module 230 continues to track user activity in virtual space 301 and, because no user-selectable function of the target application can complete structure 310 in a more efficient way, no user-selectable function or feature of the target application is introduced to the user at this juncture.

Figure 3D:
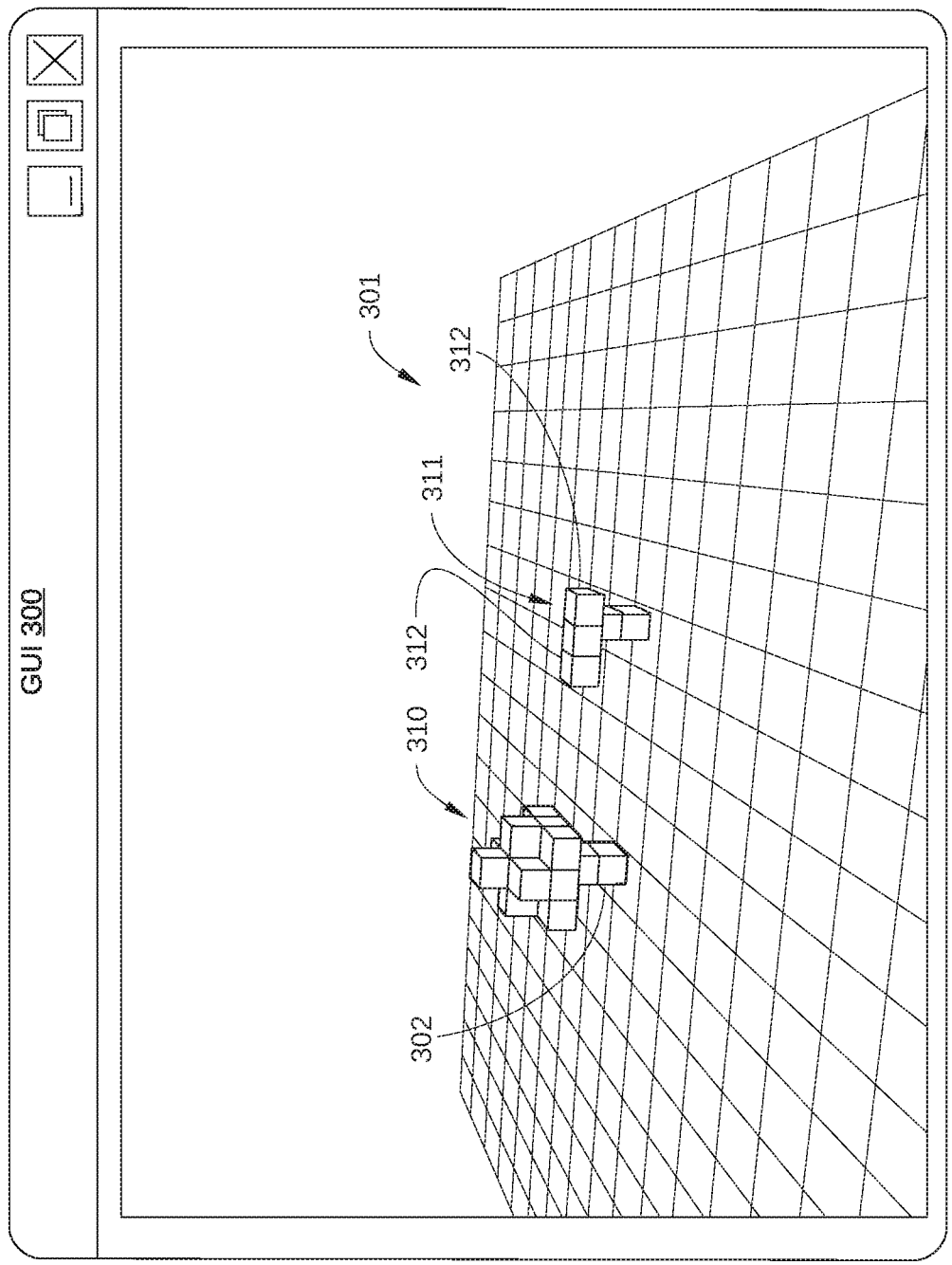

FIG. 3D is a schematic illustration of GUI 300 in which the user has begun placing blocks 302 in virtual space 301 to form a second structure 311, according to various embodiments of the invention. As shown, structure 311 initially appears to be identical to structure 311, and has been formed by the placement of a second group of blocks 312 in appropriate locations within virtual space 301. Monitoring module 230 tracks user activity in virtual space 301 and, because structure 311 initially appears to be identical to structure 311, determines that a function from the target application, for example, a copy tool, can enable the user to complete the task of creating an identical structure to structure 310 more quickly than when the user employs functions from the host application and/or functions from the target application that have already been introduced to the user.

Figure 3E:
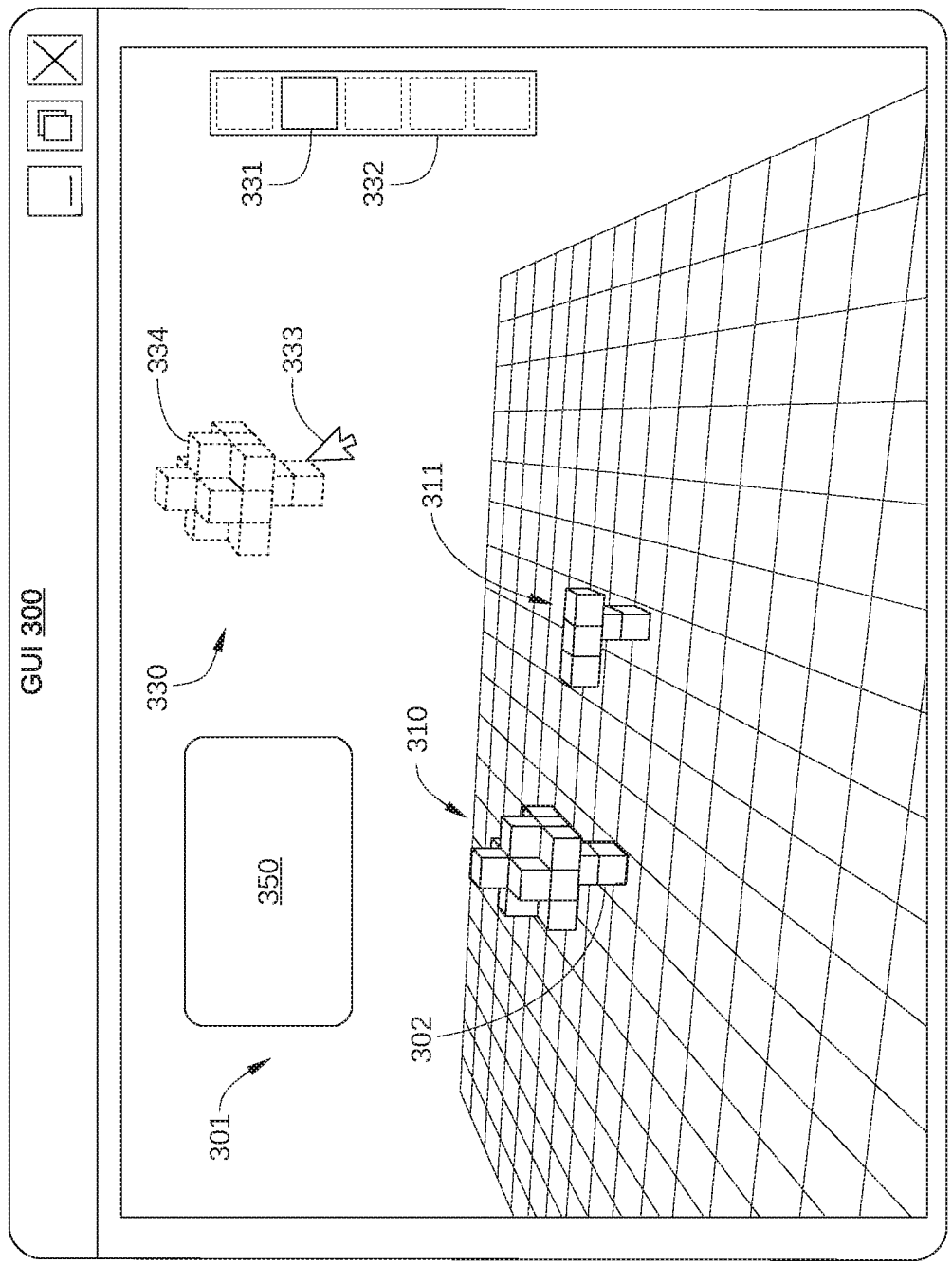

FIG. 3E is a schematic illustration of GUI 300 in which bridge application 121 introduces a user-selectable function of the target application to a user, according to various embodiments of the invention. As shown, bridge application 121 causes a new user-selectable function of the target application, in this case a copy tool 330, to be introduced to the user of bridge application 121. Copy tool 330 includes an activation button 331 that, in the embodiment illustrated in FIG. 3E, appears in a side-bar menu 332. In addition, a cursor 333 becomes active, and is shown dragging a copy structure 334 that is a grayed-out, identical copy of structure 310. Thus, bridge application 121 illustrates to the user that an identical copy of structure 310 can be generated and placed using a user-selectable function of the target application. Alternatively or additionally, bridge application 121 can pause progress in the current task being performed by the user and introduce tutorial information 350 associated with and describing the copy tool. Tutorial information 350 can include pictographic, video, textual, and/or audio information that describes to the user how to employ the newly introduced function of the target application.

In some embodiments, upon completion of the current task (e.g., completing second structure 311 using the newly introduced copy tool), GUI 300 returns to host application mode, and the one or more portions of the user interface of the target application (e.g., activation button 331, side-bar menu 332, and cursor 333) are no longer displayed. In other embodiments, upon completion of the current task, GUI 300 remains in a hybrid interface mode, and one or more portions of the user interface of the target application are "unlocked" or otherwise made available to the user going forward. Thus, in such embodiments, the user interface of the host application is modified to include some or all of the portions of the user interface of the target application that were just employed by the user to complete a task. In such embodiments, as more features of the target application are introduced to the user, GUI 300 displays ever more portions of the user interface of the target application. As a result, the user is gradually transitioned from the computing environment associated with the host application to the computing environment associated with the target application.

In some embodiments, the functionality of bridge application 121, as described herein, may be organized differently than described above in conjunction with FIG. 2. For example, in some embodiments, the functionality of function tracking module 220 may be included in target application module 230, monitoring module 210, or a combination of both.

Bridge Application Implementation

FIG. 4 sets forth a flowchart of method steps imparted via a graphical user interface for training a user to use a software application, according to various embodiments of the present invention. Although the method steps are described in conjunction with the systems of FIGS. 1-3E, persons skilled in the art will understand that any system configured to perform the method steps, in any order, is within the scope of the present invention.

As shown, a method 400 begins at step 401, where execution of bridge application 121 is started. As noted above, a user typically executes bridge application 121 to learn one software application based on a similar software application with which the user is already familiar.

In step 402, bridge application 121 causes a first user interface to be displayed, where the first user interface is based on and/or is visually similar to a user interface of a first (host) application. It is noted that, over time, the first user interface can change visually and/or functionally, as more functions of a target application are incorporated into the first user interface. It is further noted that the target application generally has a second user interface that is different from the first user interface.

In step 403, bridge application 121 receives a user input via the current version of the first user interface, such as a mouse click or other input from an I/O device 180. It is noted that the current version of the first user interface being displayed typically includes one or more portions of the user interface of the target application, namely the portions of the user interface of the target application that have been previously unlocked or otherwise made available to the user. Such portion(s) of the user interface of the target application have been incorporated into the first user interface to provide one or more functions of the target application to the user, to enable the user to perform one or more subsequent operations relative to the one or more functions. Generally, the user input is part of a current task that is being performed in bridge application 121 by the user. In some instances, the user input is generated via a function or feature of the host application, while in other instances, the user input is generated via a function or feature of the target application that has become available or provided to the user by modification of the first user interface (of the host application) with a portion of the second user interface (of the target application).

In step 404, bridge application 121 performs one or more functions in response to the user input received in step 403. Thus, in an instance in which the user input received in step 403 is via a portion of the user interface of the target application that has been incorporated into the first user interface, bridge application performs the function(s) of the target application that correspond to that portion of the user interface of the target application. In this way, the user performs functions of the target application via the first user interface.

In step 405, bridge application 121 determines whether the user is currently eligible to learn a new function of the target application. For example, in some embodiments, such a determination is based on a number of new functions of the target application that have been introduced to the user in a predetermined time interval or within a certain number of user actions. If bridge application 121 determines the user is eligible to learn a new function, method 400 proceeds to step 405; if bridge application 121 determines the user is not eligible to learn a new function, method 400 returns to step 403.

In step 406, bridge application 121 determines a user-selectable function or other feature of the target application. Specifically, bridge application 121 determines a function of the target application that can be beneficial to the user at the present time. In some embodiments, the function so determined is selected from a group of functions of the target application that are currently eligible for being introduced to the user. In some embodiments, the group of functions may be a complete list of functions of the target application that have not yet been introduced to the user. In some embodiments, the group of functions may be a sequential list of functions of the target application, and the next function on the list is considered the eligible function. In some embodiments, the group of functions include the functions of the target application for which the requisite precursor function or functions have been already been introduced to the user.

In embodiments in which multiple functions are eligible to be introduced to the user, bridge application 121 determines which of the multiple eligible functions is the most beneficial for the user at the present time. In some embodiments, bridge application 121 calculates a benefit value for each eligible function, and selects the function having the highest benefit value associated therewith. In such embodiments, the benefit value of each eligible function can be based on one or more of a plurality of factors. Such factors include how quickly a user can perform a user task via a candidate function compared to how quickly the user can perform the user task without using the candidate function. In such embodiments, the use of other functions of the target application that have been previously introduced to the user may be assumed to be employed when calculating how quickly the user can perform the user task without using the candidate function. Such factors may also include how many mouse clicks or other input operations are executed by the user to perform the user task with the candidate function vs. without the candidate function. Other factors may also be considered in calculating the benefit value for each eligible function, including computational load, power expenditure, value to the user (e.g., by filling a detected gap in the knowledge of the user with respect to the target application) and the like.

In optional step 407, bridge application 121 presents tutorial information to the user that is associated with and/or describes the user-selectable function or other feature of the target application determined in step 406. The tutorial information can include pictographic, video, textual, and/or audio information that describes to the user how to employ the candidate function of the target application that has been selected to be introduced to the user.

In step 408, bridge application 121 updates the functions of the target application that are eligible to be introduced to the user. It is noted that such function eligibility is determined based on the most recently introduced function selected in step 405, as well as on previously introduced functions associated with the target application.

In step 409, bridge application 121 causes the first user interface to be displayed with portions of the second user interface (i.e., the user interface for the target application). The portions of the second user interface correspond to and enable the candidate function selected in step 406. Thus, the first user interface is modified to include one or more functions or features of the target application. In some embodiments, upon receipt of a user input via one or more portions of the second user interface that are included in the first user interface, bridge application 121 causes the first user interface to then be displayed with the one or more portions of the second user interface. That is, the first user interface remains in a hybrid interface mode, and thereby incrementally transitions in appearance and functionality from that of the user interface of the host application to the user interface of the target application. Method 400 then proceeds back to step 403.

In the embodiments illustrated herein, bridge application 121 is described as including at least a portion of the code of the host application and a portion of the code of the target application. In other embodiments, bridge application 121 is configured to interact with a separate and distinct host application and a separate and distinct target application. In such embodiments, the host application and the target application generally include an architecture that enables such interactions from bridge application 121. In such embodiments, a specific instance of bridge application 121 may be configured to perform the application-bridging operations described herein for multiple different host and target applications that are suitably configured.

In sum, embodiments of the present invention provide techniques for facilitating the learning of a software application. A cross-application bridge is configured to initially present a user interface that is based on and appears similar to the user interface of an application that is familiar to the user. Based on user activity within the user interface, a series of new functions or tools of a target application being learned is introduced to the user. In response to each new function or tool that is introduced and/or demonstrated to the user, the user interface presented by the cross-application bridge can be changed, and incrementally resembles the user interface of the target software application. Such changes are triggered by user behavior in the user interface, so that the new capabilities or functions of the target application presented to the user are presented in a motivated learning scenario.

At least one advantage of the disclosed techniques is that the user interface of a software application with which the user is already familiar can be used as a foundation for expanding the user's knowledge of a new and unfamiliar software application. Rather than working against the user's normal production and assimilation biases, operating in the familiar user interface enables the user to learn new functionalities of the software application while completing personally-relevant tasks. Thus, the user is not immersed in an unfamiliar computing environment that requires significant effort to accomplish simple tasks. As a result, the disclosed techniques improve the functioning or operation of a computing device. Specifically, the techniques described herein improve the efficiency of using a computing device by enabling the user to incrementally transition from a familiar user interface to the user interface of a different and/or more advanced software application. These advantages provide at least one technological improvement over prior art techniques, in which many advanced and powerful functions of a feature-rich software application are never learned by the user due to the steep learning curve associated with such software applications.

1. In some embodiments, a computer-implemented method for software application training comprises: causing a first user interface to be displayed on a display, wherein the first user interface is based on a user interface associated with a first software application; receiving a user input via the first user interface from a user; determining a first function associated with a second software application that should be provided to the user based on the user input; and causing the first user interface and a portion of a second user interface associated with the second application and incorporated into the first user interface to be displayed on the display, wherein the portion of the second user interface provides the first function to the user to enable the user to perform one or more subsequent operations relative to the first function.

2. The computer-implemented method of clause 1, wherein, at the time the user input is received via the first user interface, the first function is not available to the user via the first user interface.

3. The computer-implemented method of clauses 1 or 2, further comprising, prior to determining the first function associated with the second software application that should be provided to the user, determining that the user is eligible to learn at least one new function associated with the second software application.

4. The computer-implemented method of any of clauses 1-3, further comprising, prior to receiving the user input, adding the first function to a list of functions associated with the second software application that are eligible to be introduced to the user via the first user interface.

5. The computer-implemented method of any of clauses 1-4, wherein the list of functions is based on one or more functions associated with the second software application that have been previously introduced to the user via the first interface.

6. The computer-implemented method of any of clauses 1-5, further comprising: receiving a second user input via the portion of the second user interface from the user; and in response, displaying the first user interface without the portion of the second user interface incorporated into the first user interface.

7. The computer-implemented method of any of clauses 1-6, further comprising: receiving a second user input via the portion of the second user interface from the user; and in response, causing the first function to be performed.

8. The computer-implemented method of any of clauses 1-7, further comprising, prior to causing the first user interface and the portion of the second user interface to be displayed, causing tutorial information associated with the first function to be displayed.

9. The computer-implemented method of any of clauses 1-8, wherein causing the tutorial information associated with the first function to be displayed comprises causing the tutorial information to be displayed via the first user interface.

10. The computer-implemented method of any of clauses 1-9, wherein determining the first function associated with the second software application that should be provided to the user comprises: calculating a first benefit value for the first function; calculating a second benefit value for a second function associated with the second software application; determining that the first benefit value exceeds the second benefit value; and in response, selecting the first function to provide to the user.

11. A non-transitory computer readable medium storing instructions that, when executed by a processor, cause the processor to perform the steps of: causing a first user interface to be displayed on a display, wherein the first user interface is based on a user interface associated with a first software application; receiving a user input via the first user interface from a user; determining a first function associated with a second software application that should be provided to the user based on the user input; and causing the first user interface and a portion of a second user interface associated with the second application and incorporated into the first user interface to be displayed on the display, wherein the portion of the second user interface provides the first function to the user to enable the user to perform one or more subsequent operations relative to the first function.

12. The non-transitory computer readable medium of clause 11, further comprising, prior to receiving the user input, adding the first function to a list of functions associated with the second software application that are eligible to be introduced to the user via the first user interface.

13. The non-transitory computer readable medium of clauses 11 or 12, further comprising: receiving a second user input via the portion of the second user interface from the user; and in response, displaying the first user interface without the portion of the second user interface incorporated into the first user interface.

14. The non-transitory computer readable medium of any of clauses 11-13, further comprising: receiving a second user input via the portion of the second user interface from the user; and in response, causing the first function to be performed.

15. The non-transitory computer readable medium of any of clauses 11-14, further comprising, prior to causing the first user interface and the portion of the second user interface to be displayed, causing tutorial information associated with the first function to be displayed.

16. The non-transitory computer readable medium of any of clauses 11-15, wherein causing the tutorial information associated with the first function to be displayed comprises causing the tutorial information to be displayed via the first user interface.

17. The non-transitory computer readable medium of any of clauses 11-16, wherein determining the first function associated with the second software application that should be provided to the user comprises: calculating a first benefit value for the first function; calculating a second benefit value for a second function associated with the second software application; determining that the first benefit value exceeds the second benefit value; and in response, selecting the first function to provide to the user.

18. The non-transitory computer readable medium of any of clauses 11-17, wherein the first benefit value quantifies an improvement in a user experience associated with completing a task via the first user interface using the first function compared to completing the task via the first user interface without the first function, and the second benefit value quantifies an improvement in a user experience associated with completing the task via the first user interface using the second function compared to completing the task via the first user interface without the second function.

19. The non-transitory computer readable medium of any of clauses 11-18, further comprising, prior to calculating the first benefit value and the second benefit value, selecting the first function and the second function from a plurality of functions associated with the second software application that are currently eligible to be made available to the user via the first user interface.

20. A system, comprising: a computing device that includes: a memory that stores instructions, and a processor that is coupled to the memory and, when executing the instructions, is configured to: cause a first user interface to be displayed on a display, wherein the first user interface is based on a user interface associated with a first software application; receive a user input via the first user interface from a user; determining a first function associated with a second software application that should be provided to the user based on the user input; and cause the first user interface and a portion of a second user interface associated with the second application and incorporated into the first user interface to be displayed on the display, wherein the portion of the second user interface provides the first function to the user to enable the user to perform one or more subsequent operations relative to the first function.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for software application training that is implemented via a processor associated with a computing device, the method comprising:
   causing a first user interface to be displayed on a display, wherein the first user interface is based on a user interface associated with a first software application;
   receiving a user input via the first user interface from a user;
   determining a first function associated with a second software application that should be provided to the user based on the user input; and
   causing the first user interface and a portion of a second user interface that is associated with the second application and is incorporated into the first user interface to be displayed on the display, wherein the portion of the second user interface provides the first function to the user and enables the user to perform one or more subsequent operations relative to the first function using the first interface.

2. The method of claim 1, wherein, at the time the user input is received via the first user interface, the first function is not available to the user via the first user interface.

3. The method of claim 1, further comprising, prior to determining the first function associated with the second software application that should be provided to the user, determining that the user is eligible to learn at least one new function associated with the second software application.

4. The method of claim 1, further comprising, prior to receiving the user input, adding the first function to a list of functions associated with the second software application that are eligible to be introduced to the user via the first user interface.

5. The method of claim 4, wherein the list of functions is based on one or more functions associated with the second software application that have been previously introduced to the user via the first interface.

6. The method of claim 1, further comprising:
   receiving a second user input via the portion of the second user interface from the user; and
   in response, displaying the first user interface without the portion of the second user interface incorporated into the first user interface.

7. The method of claim 1, further comprising:
   receiving a second user input via the portion of the second user interface from the user; and
   in response, causing the first function to be performed.

8. The method of claim 1, further comprising, prior to causing the first user interface and the portion of the second user interface to be displayed, causing tutorial information associated with the first function to be displayed.

9. The method of claim 8, wherein causing the tutorial information associated with the first function to be displayed comprises causing the tutorial information to be displayed via the first user interface.

10. The method of claim 1, wherein determining the first function associated with the second software application that should be provided to the user comprises:
    calculating a first benefit value for the first function;
    calculating a second benefit value for a second function associated with the second software application;
    determining that the first benefit value exceeds the second benefit value; and
    in response, selecting the first function to provide to the user.

11. A non-transitory computer readable medium storing instructions that, when executed by a processor, cause the processor to perform the steps of:
    causing a first user interface to be displayed on a display, wherein the first user interface is based on a user interface associated with a first software application;
    receiving a user input via the first user interface from a user; determining a first function associated with a second software application that should be provided to the user based on the user input; and
    causing the first user interface and a portion of a second user interface that is associated with the second application and is incorporated into the first user interface to be displayed on the display, wherein the portion of the second user interface provides the first function to the user and enables the user to perform one or more subsequent operations relative to the first function using the first user interface.

12. The non-transitory computer readable medium of claim 11, further comprising, prior to receiving the user input, adding the first function to a list of functions associated with the second software application that are eligible to be introduced to the user via the first user interface.

13. The non-transitory computer readable medium of claim 11, further comprising:
    receiving a second user input via the portion of the second user interface from the user; and
    in response, displaying the first user interface without the portion of the second user interface incorporated into the first user interface.

14. The non-transitory computer readable medium of claim 11, further comprising:
    receiving a second user input via the portion of the second user interface from the user; and
    in response, causing the first function to be performed.

15. The non-transitory computer readable medium of claim 11, further comprising, prior to causing the first user interface and the portion of the second user interface to be displayed, causing tutorial information associated with the first function to be displayed.

16. The non-transitory computer readable medium of claim 15, wherein causing the tutorial information associated with the first function to be displayed comprises causing the tutorial information to be displayed via the first user interface.

17. The non-transitory computer readable medium of claim 11, wherein determining the first function associated with the second software application that should be provided to the user comprises:
    calculating a first benefit value for the first function;
    calculating a second benefit value for a second function associated with the second software application;
    determining that the first benefit value exceeds the second benefit value; and
    in response, selecting the first function to provide to the user.

18. The non-transitory computer readable medium of claim 17, wherein the first benefit value quantifies an improvement in a user experience associated with completing a task via the first user interface using the first function compared to completing the task via the first user interface without the first function, and the second benefit value quantifies an improvement in a user experience associated with completing the task via the first user interface using the second function compared to completing the task via the first user interface without the second function.

19. The non-transitory computer readable medium of claim 17, further comprising, prior to calculating the first benefit value and the second benefit value, selecting the first function and the second function from a plurality of functions associated with the second software application that are currently eligible to be made available to the user via the first user interface.

20. A system, comprising:
    a computing device that includes:
        a memory that stores instructions, and
        a processor that is coupled to the memory and, when executing the instructions, is configured to:
            cause a first user interface to be displayed on a display, wherein the first user interface is based on a user interface associated with a first software application;
            receive a user input via the first user interface from a user; determining a first function associated with a second software application that should be provided to the user based on the user input; and
            cause the first user interface and a portion of a second user interface that is associated with the second application and is incorporated into the first user interface to be displayed on the display, wherein the portion of the second user interface provides the first function to the user and enables the user to perform one or more subsequent operations relative to the first function using the first user interface.

* * * * *